April 29, 1969  D. PURUCKER ET AL  3,441,257

CONTROLLED ATMOSPHERE ROTARY FURNACE

Filed Dec. 1, 1967

Inventors
Donald Purucker
Walter J. Hartwig
By Arthur M. Streich
Attorneys

United States Patent Office 3,441,257
Patented Apr. 29, 1969

3,441,257
CONTROLLED ATMOSPHERE ROTARY FURNACE
Donald Purucker, Waterford, and Walter J. Hartwig, Oconomowoc, Wis., assignors to Allis-Chalmers Manufacturing Company, Milwaukee, Wis.
Filed Dec. 1, 1967, Ser. No. 687,360
Int. Cl. F27b 14/02, 7/00, 13/02
U.S. Cl. 263—12    8 Claims

ABSTRACT OF THE DISCLOSURE

A furnace is disclosed for treating particulate material with gases having characteristics of temperature and composition which result in the gases being as desired, for example, either oxidizing, reducing or neutral. The disclosed furnace is operative in a first manner, while standing in a vertical position, to simulate the treatment that a material receives in a static bed such as is provided by a horizontal traveling grate furnace. The furnace here disclosed is also operative in a second manner, while supported in a generally horizontal position and a section of the furnace rotated about a generally horizontal axis, to simulate the treatment that a material receives in a dynamic bed tumbling in a rotary kiln. The furnace is further operative to tilt downwardly from the vertical position to the horizontal position to change from the first manner of operation to the second manner of operation and vice versa to tilt upwardly, and without exposing the particulate material to atmosphere external of the furnace or losing control of either temperature or atmospheric conditions within the furnace.

BACKGROUND OF THE INVENTION

Field of the invention

This invention relates to a furnace for processing raw materials at high temperatures and under controlled atmospheric conditions. In particular this invention relates to a furnace having a capability of treating materials under static and dynamic conditions, and changing from the former to the latter, while maintaining control of atmospheric conditions, as for example while maintaining a neutral or reducing atmosphere.

Description of the prior art

The processing of raw materials in the solid state and at high temperatures is practiced in many industries. Some examples are: the burning of limestone to produce lime; the calcining of certain materials in the production of refractories and alumina; the pelletizing of iron ore; and the production of portland cement. All of these high temperature processes are conducted in oxidizing atmospheres. Efficient systems for such processing operations have been developed that utilize both a horizontal traveling grate carrying a static bed of material through a furnace housing and a rotating kiln tumbling the body of material to treat the material with high temperature gases under dynamic conditions. Examples of such apparatus and methods are disclosed in U.S. Patent 2,466,-601 of 1949; U.S. Patent 2,925,336 of 1960; and U.S. Patent 3,313,534 of 1967.

Summary of the present invention

High temperature processes are now achieving significance in which either neutral or reducing conditions are required at least during some stage or stages of processing. Examples of such processes are: magnetic roasting, and partial or direct reduction of iron ore; arsenic elimination from iron ore; sulphur elimination during a lime burning operation; the production of white cement; and the direct reduction of alumina. In addition to the need for neutral or reducing atmosphere at least during some stage of such processing, it is also desirable to be able to apply and control such atmospheres to treat such materials under both static and dynamic conditions.

It is particularly important to achieve a very high degree of control over such atmospheric conditions when material is treated under conditions that change during the treatment, for example, from static to dynamic and back to static again. To provide a new and improved furnace meeting these requirements is a primary object of the present invention.

Another object of the present invention is to provide a new and improved controlled atmosphere furnace which can be operated to stop and freeze a process at any of various states involving static or dynamic treatment with oxidizing or reducing gases, by flooding the furnace with an inert gas.

According to a preferred embodiment of the present invention a first framework is provided having a stationary horizontal bed and a second framework having a tiltable bed is carried by a gimbal having trunnions spanning and rotatably supported on the first bed. A generally cylindrical rotary kiln is carried by supports connected to the second bed at a location spaced apart from the gimbal. The kiln is rotatable about an axis parallel to the second bed. When the second bed is in a vertical position a pot, which may be filled with material to be treated in the furnace, is inserted between the gimbal and the rotary kiln. The rotary kiln is then lowered into engagement with the top of the pot. The pot is provided with a bottom comprising a gas permeable grate and, with the second bed in a vertical position, gases can be passed downwardly through the kiln, the material in the pot and out through a passage defined in the gimbal to thereby treat the material in a static or at rest condition. A first drive assembly is provided to tilt the second bed downwardly until the central axis of the pot and kiln slopes downwardly from the pot toward the kiln and the material in the pot is dumped into the kiln. The second bed is then tilted back upwardly until the bed is in a horizontal position and a second drive assembly rotates the kiln about its central cylindrical axis while gases pass axially through the kiln or into the kiln through passages provided in kiln shell and leading thereto according to U.S. Patent 3,182,980.

Other features and objects of the invention that have been attained will appear from the more detailed description to follow with reference to an embodiment of the present invention shown in the accompanying drawings.

Description of the preferred embodiment

Figure 1:
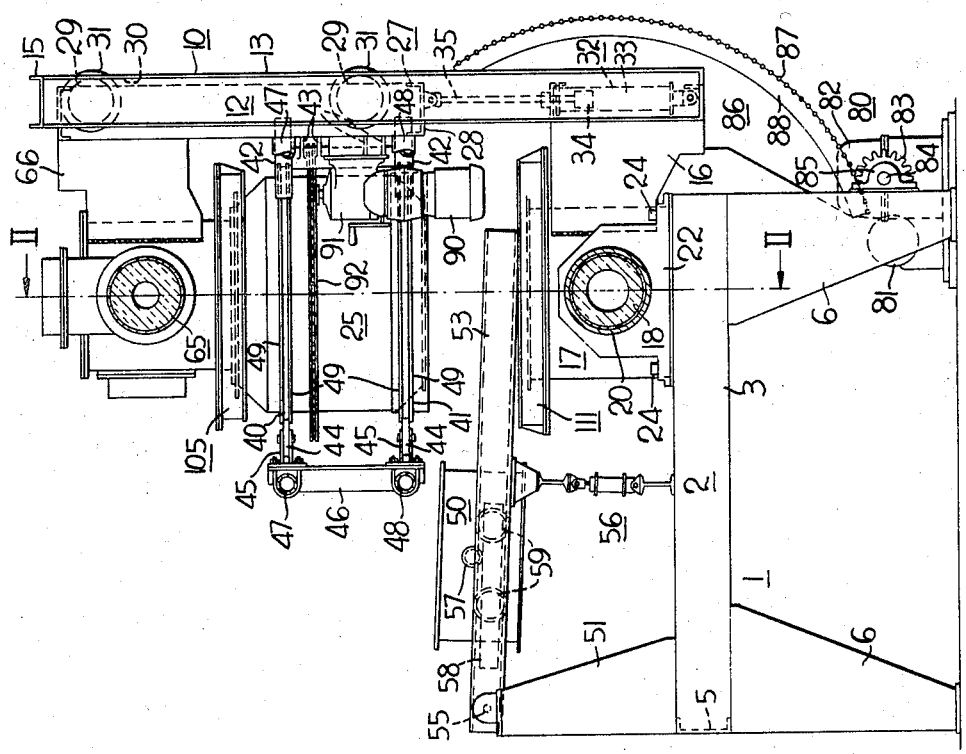
FIG. 1 of the accompanying drawings shows in side elevation, partly in section, a furnace according to the present invention.
Figure 2:
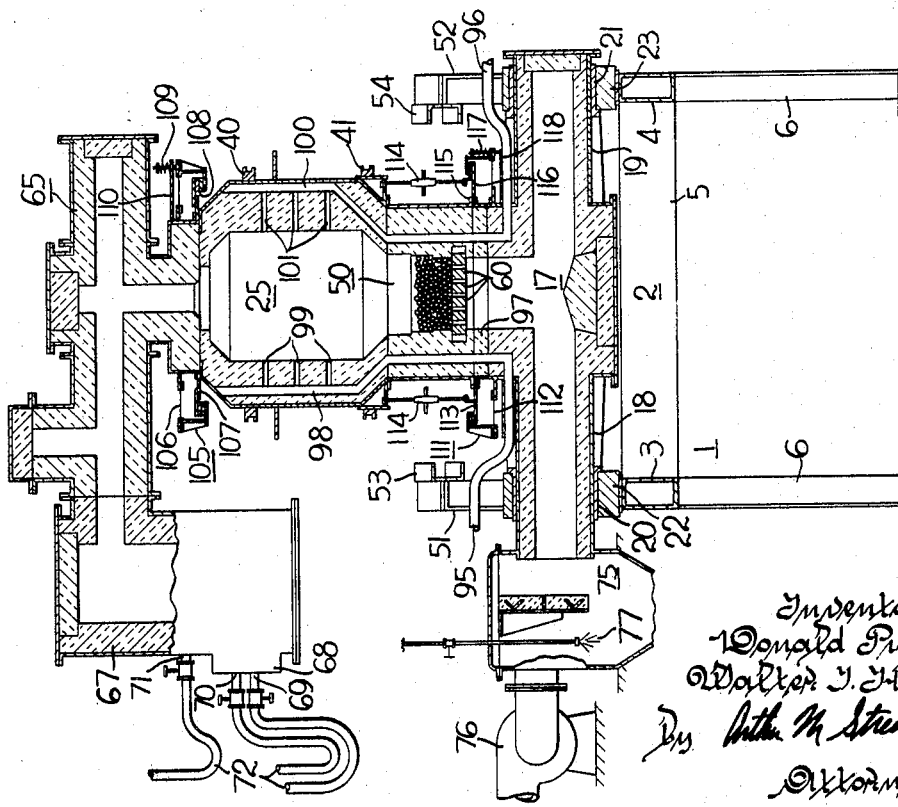
FIG. 2 is a view taken along line II—II in FIG. 1 and viewing the structure in the direction indicated by arrows.

Referring to FIGS. 1 and 2, a first framework 1 is disclosed comprising a stationary horizontal bed 2 of longitudinal beams 3, 4 and a cross beam 5, supported in a fixed elevated position by columns 6. A second framework 10, in FIG. 1, comprises a bed 12 of a pair of parallel longitudinal beams 13 (only one of which can be seen in FIG. 1) and a cross beam 15. The second bed 12 is attached by side plates 16 to a gimbal 17. The gimbal 17 has a pair of trunnions 18, 19 journaled in bearings 20, 21 carried by bearing blocks 22, 23. The bearing blocks 22, 23 are mounted and secured (for example by bolts 24) on top of the beams 3, 4 in spanning relation thereto. The second framework 10 and second bed 12 are therefore tiltably carried by the gimbal 17 which has its trunnions rotatably carried and supported by the bed 2 of the first framework 1.

A generally cylindrical rotary kiln 25 is carried by a carriage assembly 27 parallel to the beams 13, that define the second bed 12, for rotation about a central axis through the kiln. The carriage assembly 27 is supported by the beams 13 of the second bed 12. The carriage assembly 27 includes a platform 28 having wheels 29 fitted in tracks 30 and alignment disks 31 to keep the platform centered in spanning relation between tracks 30 on each beam 13. A fluid pressure operated ram assembly 32 is provided to move the carriage plateform 28 along the tracks 30. The ram assembly 32 comprises a cylinder 33 secured to the bed 12 and a piston 34 having a rod 35 connected to the carriage platform 28.

The rotary kiln 25 is provided with a pair of axially spaced riding rings 40, 41. A first set of kiln support rollers 42 engaging the riding rings 40, 41 are arranged between the kiln 25 and the carriage platform 28 (four such rollers are provided but only two can be seen in FIG. 1). Each roller 42 is carried by a bracket 43 attached to the carriage platform 28. A second set of kiln support rollers 44 is arranged on the side of kiln 25 opposite to the bed 12. The rollers 44 are carried by bracket 45 attached to a beam 46 parallelly spaced from bed 12. The beam 46 is attached for support to encircling arms 47, 48 that extend around the kiln 25 and spaced outwardly thereof, and are anchored on carriage platform 28. The beam 46 and encircling arms 47, 48 may also be seen in FIGS. 3 and 4 where somewhat less of this structure has been broken away than is the case in FIG. 1.

As shown in FIG. 1, the riding rings 40, 41 each have annular edges 49 of greater diameter than the ring therebetween so that each roller 43, 44 projects between edges 49 in order to support the kiln 25 when the bed 12 and carriage platform 28 are tilted to the vertical position shown in FIG. 1.

When the second bed 12 is in a vertical position, as shown in FIG. 1, a pot 50 containing a charge of material to be treated may be inserted between the gimbal 17 and kiln 25. Means provided to support and transport the pot 50 into the described position include a pair of vertical columns 51, 52 mounted on top of the beams 3, 4 and over columns 6. A pair of tracks 53, 54 are pivotally attached, as at pivot 55 in FIG. 1, to the top of the respective support columns 51, 52. The tracks 53, 54 are each also supported by an adjustable height column 56 (one of which is shown in FIG. 1). The pot 50 has a pair of radially projecting trunnions 57 (one of which is shown in FIG. 1) that ride on a carriage 58 having wheels 59 engaging the tracks 53, 54. As shown in FIG. 2, the pot 50 is provided with a gas permeable bottom grate made up of a plurality of grate bars 60 spaced apart from each other a distance sufficient to provide a free flow of gases therethrough while maintaining the body of material within the pot 50.

In order to provide for a gas flow through kiln 25 and pot 50, a gas flow passage defining header 65 is arranged over kiln 25 and connected for support by side plates 66 (see FIG. 1) to the carriage platform 28. A combustion chamber 67 (see FIG. 2) is connected to the header 65. The combustion chamber 67 is provided with a burner 68 having a fuel inlet 69 and primary inlet 70. A secondary air inlet 71 may be provided in the chamber 67.

Flexible hoses 72 are provided to deliver air and fuel to chamber 67 because, as will be explained more fully later, combustion chamber 67 swings downwardly with other structures supported by the tiltable bed 12.

Combustion gases from chamber 67 that pass through header 65, kiln 25 and pot 50 are exited through a passage defined within gimbal 17 extending outwardly through trunnion 18. A cone type particle separator 75 may be connected to trunnion 18 to remove ash and other particles from a gas stream. The separator 75 may in turn be connected to the inlet of a fan 76 and a water spray 77 may be provided in the separator 75 to cool gases before they enter fan 76.

Figure 3:
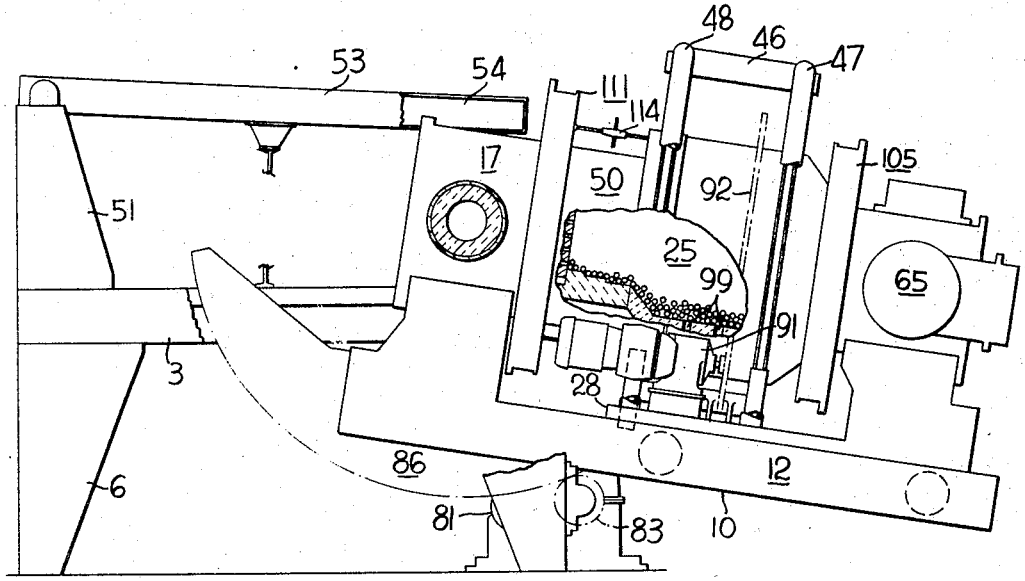
FIG. 3 is a side elevation, partly in section and with a portion of external structure broken away to show the interior thereof, and somewhat similar to FIG. 1 but with the furnace in a second position in which the furnace is tilted downwardly below a horizontal position.
Figure 4:
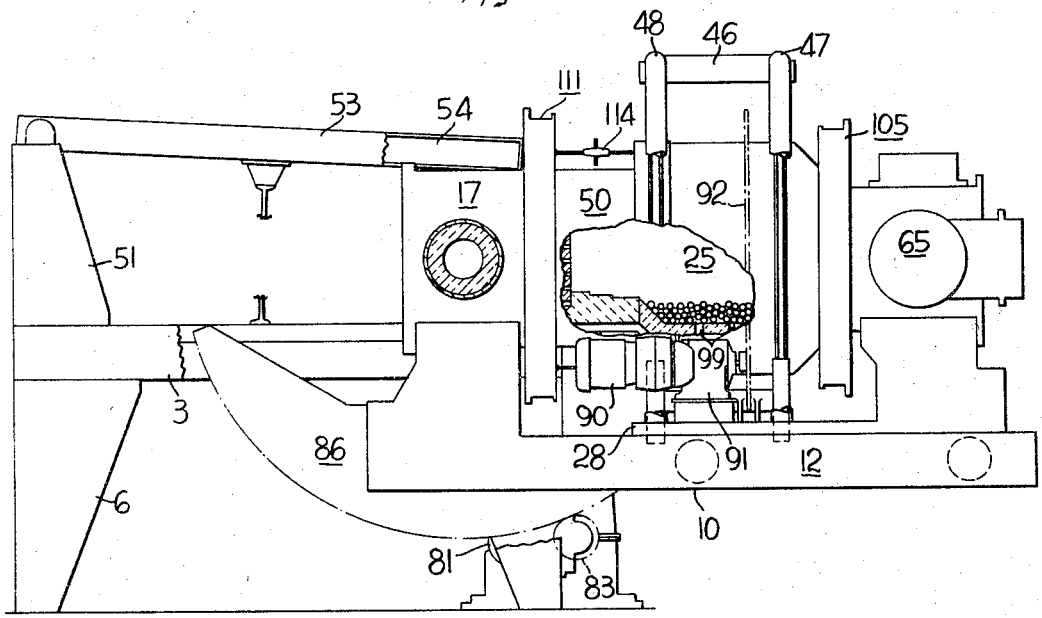
FIG. 4 is similar to FIG. 3 but with the furnace tilted upwardly from hte second position to a third and horizontal position.

A first drive assembly 80 is provided to tilt the second framework 10 and bed 12 from the position shown in FIG. 1 to the positions shown in FIGS. 3 and 4, and back to the position of FIG. 1 again. The assembly 80 comprises a motor 81 driving speed reducer 82 with a pinion gear 83 mounted on an output shaft 84 of the reducer 82. The shaft 84 is also journaled in a bearing block 85 attached to an adjacent column 6. The pinion gear thus supported by the first framework 1 engages a gear segment 86 attached to beam 13 of bed 12 of the second framework 10. A particularly desirable form of gear segment 86 for this apparatus is one in which a length of roller chain 87 is connected through flanges 88 to segment 86, with individual rollers of chain 87 each being rotatable about their central axis.

A second drive assembly with a motor 90 (FIG. 1) is provided to rotate the kiln 25 about its central axis when the kiln is in the position shown in FIG. 4. As shown in FIG. 1, the motor 90 drives a speed reducer 91 which in turn drives a gear 92 encircling kiln 25.

As shown in FIG. 2, a second gas flow system is provided, according to U.S. Patent 3,182,980, for supplying gases to and through kiln 25. This system includes an oxidizing gas delivery pipe 95, a hydrocarbon gas fuel delivery pipe 96 and a manifold disk 97. In this second gas flow system a first passage is defined from pipe 95, through a portion of gimbal 17, and manifold disk 97 to a first plurality of axial passages 98 having radial passages 99 into kiln 25. A second passage in this system is defined from pipe 96, through a portion of gimbal 17 and manifold disk 97 to a second plurality of axial passages 100 having radial passages 101. The design, construction and operation of manifold disk 97 and passages 98, 99, 100 and 101 is described in detail in U.S. Patent 3,182,980 and therefore need not be repeated here.

Although header 65 and combustion chamber 67 tilt downwardly with kiln 25 when the bed 12 is lowered as shown in FIGS. 3 and 4, the header 65 and chamber 67 do not rotate with kiln 25. A special seal 105 is therefore provided between header 65 and kiln 25. The seal 105 comprises an annular flexible collar 106 attached to the neck of header 65 and an annular collar 107 attached to the adjacent end of kiln 25. Each coller 106 and 107 carries an annular ring which provides annular rubbing seal at 108. A plurality of spring biased devices 109 (one is shown in FIG. 2) is supported on header 65 by a member 110 and is connected to flexible collar 106 to urge collar 106 to flex and maintain the sealing engagement at 108.

Another seal, numbered 111, is provided between the pot 50 and gimbal 17. This seal comprises an annular flexible collar 112 attached to the neck of gimbal 17 and another annular collar 113.

The collar 113 is connected to kiln 25 by a plurality of turnbuckles 114. Each turnbuckle 114 is connected connected on one end to kiln 25 and on the other end to the collar 113. The collar 113 engages the lower rim 115 of pot 50 with no relative movement therebetween (i.e., pot 50 rotates with kiln 25 as will be explained later) and the collars 112 and 113 each carry an annular ring which provides a rubbing seal at 116. A plurality of spring biased devices 117 (one is shown in FIG. 2) is supported on gimbal 17 by a member 118 and is connected to flexible collar 112 to urge collar 112 to flex and maintain the sealing engagement at 116.

FIGS. 3 and 4 will be described during the description of the operation of the apparatus which follows.

In the operation of the described apparatus and beginning with the apparatus in the position shown in FIG. 1, the pot 50 with a charge of material to be treated, is placed on carriage 58 which is rolled down tracks 53, 54 until the pot is centered over gimbal 17. When the pot 50 is centered over gimbal 17, the adjustable columns 56 lower tracks 53, 54 about pivots 55 until pot 50 rests upon gimbal 17 and carriage 58 disengages with the trunnions 57 of pot 50. The carriage 58 is then withdrawn and may be removed from tracks 53, 54. Ram assembly 32 is then actuated so rod 35 lowers platform 28 and kiln 25 downwardly until kiln 25 engages the top of pot 50. Turnbuckles 114 are then attached to collar 113 and tightened to secure pot 50 to kiln 25 as an integral part thereof. The attaching and tightening of turnbuckles 114 also provided a gas tight joint between collar 113 and rim 115 of pot 50; and brings into engagement the rims that provide the rubbing seal at 116.

With the apparatus now assembled and in the position shown in FIG. 2, the treatment of the charge of material in pot 50 can begin. Combustion gases from burner 68 supply a heated stream of combustion gases which may provide a reducing atmosphere or when mixed with secondary air from inlet 71 may provide an oxidizing gas stream, at elevated temperatures, which may be drawn by fan 76 through header 65, kiln 25, pot 50 (and the charge of material therein), gimbal 17, trunnion 18 and separator 75. The temperature of the charge of material may be thereby raised to dry, preheat and preburn the charge material under the same static conditions as take place in the processes and equipment disclosed in the prior art patents hereinbefore referred to and identified, or any other desired static conditions. When the charge has been prepared for further treatment under the dynamic conditions that occur within a rotary kiln, the motor 81 drives pinion gear 83 and the gear sement 86 to lower the second framework 10 and bed 12 downwardly to the position shown in FIG. 3. With the bed 12, pot 50 and kiln 25 in the position shown in FIG. 3, the charge of material in pot 50 will dump into kiln 25. After a period of time sufficient to allow the charge material in pot 50 to fall into kiln 25, motor 81 is again actuated to drive pinion gear 83 and the gear segment 86 to raise the second framework 10 and bed 12 from the position shown in FIG. 3 to the position shown in FIG. 4. With the apparatus in the position shown in FIG. 4 motor 90, through speed reducer 91, turns gear 92 to rotate kiln 25 about its central axis. In this position kiln 25 supports pot 50 (through turnbuckles 114 shown in FIG. 2) as an overhung load and pot 50 rotates as part of an assembly with kiln 25. In this position kiln 25 can be operated as an oxidizing kiln, a reducing kiln (with a gas flow proceeding axially through kiln 25 from right to left as shown in FIG. 4) or as a controlled atmosphere kiln according to U.S. Patent 3,182,980. When operated in the manner described in U.S. Patent 3,182,980 gases are admitted to kiln 25 through the pipes 95, 96, manifold disk 97, axial passages 98, 100 and radial passages 99, 101 (shown in FIG. 2). Passages 99 are also shown in the break-away section of FIG. 4. After treatment of the charge material is completed in the position of FIG. 4, the motor 81 may again be actuated to drive pinion gear 83 and gear segment 86 to raise the second framework 10 and bed 12 from the position shown in FIG. 4, back to the position shown in FIG. 2, causing the charge material to fall back into pot 50. The charge material may then be cooled by passing therethrough either cooling air or an inert gas such as nitrogen, admitted through inlet 71 and drawn through the material by fan 76. The treatment of the charge material may be stopped at any time and the furnace flooded with inert gas to freeze the condition of the material at any stage of treatment. After the charge of material in pot 50 has been cooled, and the furnace is in the position of FIG. 2, turnbuckles 114 can be disconnected, kiln 25 raised by ram assembly 32 and carriage 58 rolled beneath the trunnions 57 of pot 50. The adjustable columns 56 then raise tracks 53, 54 until carriage 58 engages trunnions 57 of pot 50 and lifts pot 50 off gimbal 17. The carriage 58 can then be rolled toward pivots 55 and the pot 50 removed from the carriage 58.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A furnace for treating a body of discrete particles of material with gases having desired characteristics of temperature and composition, comprising:
   (A) a first framework having a stationary generally horizontal bed;
   (B) a second framework having a second bed tiltably carried by a gimbal connected to said second bed and having trunnions spanning and rotatably supported on the bed of said first framework;
   (C) a generally cylindrical rotary kiln carried parallel to the second bed for rotation about its central axis by supports connected to the second bed, said kiln being arranged at a location thereon spaced apart from said gimbal;
   (D) a pot having an annular wall enclosed on one end by a bottom defining a gas permeable grate and open on the other top end thereof, said pot being arranged concentric to the axis of rotation of the kiln and between said gimbal and said kiln with the bottom of said pot adjacent said gimbal;
   (E) a first drive assembly mounted on one of said frameworks and engaging the other of said frameworks to tilt the second framework bed and axis of rotation of the kiln between a vertical and a horizontal position; and
   (F) a second drive assembly mounted on said second framework and engaging said kiln to rotate said kiln when said second framework bed has been tilted to said horizontal position.

2. In an apparatus according to claim 1, said gimbal defining therewithin a gas flow passage therethrough in communication with the gas permeable bottom grate of said pot, and a gas flow passage defining header connected for support to the bed of the second framework and aligned relative to the end of said cylindrical kiln remote of said pot to establish a continuous gas flow path into and through the header, kiln, pot and gimbal.

3. In an apparatus according to claim 2, said gas flow passage defined by said gimbal extending from adjacent the gas permeable bottom grate of the pot through the gimbal and at least one of said trunnions to an opening external of said first framework.

4. In an apparatus according to claim 3, a combustion chamber connected for support to the second bed and in gas flow communication with the passage defined in the header, and a fan having a gas inlet connected to the external opening defined by the trunnion, to induce a flow of gases from the combustion chamber through the kiln, pot and then out through the gimbal and trunnion.

5. In an apparatus according to claim 1, a fluid pressure operated ram assembly carried by the second framework and connecting the gimbal and kiln for relative movement therebetween toward and away from each along the bed of the second framework, whereby the ram is operative to move the kiln and gimbal relatively apart ing position in which the central axis of the pot and kiln, to provide for insertion and removal of said pot therebetween.

6. In an apparatus according to claim 5, said gimbal is attached to said second framework in fixed position and said ram assembly operates to move said kiln axially toward and away from said gimbal and pot.

7. In an apparatus according to claim 1, an annular manifold arranged in concentric relation about said kiln, a plurality of radial passages are defined in said kiln establishing gas flow communication from said annular manifold radially through said kiln to the interior thereof; and means for supplying gases to said annular manifold for injection into said kiln when said kiln is rotating in said horizontal position.

8. In an apparatus according to claim 1, said first drive assembly being operative to tilt the second framework from a vertical position downwardly to a downward sloping position in which the central axis of the pot and kiln, about which the kiln rotates, has a downward slope in a direction from the pot toward the kiln to provide for dumping material from the pot into the kiln, and said first drive being further operative to tilt the second framework from said downward sloping position upwardly to a horizontal position for rotating the kiln to tumble material therein.

References Cited
UNITED STATES PATENTS

| | | | |
|---|---|---|---|
| 1,403,265 | 1/1922 | Rahn | 263—12 |
| 3,169,755 | 2/1965 | Eklund et al. | 263—33 |

JOHN J. CAMBY, *Primary Examiner.*

U.S. Cl. X.R.
263—32; 266—36

U.S. DEPARTMENT OF COMMERCE
PATENT OFFICE
Washington, D.C. 20231

UNITED STATES PATENT OFFICE
CERTIFICATE OF CORRECTION

Patent No. 3,441,257            April 29, 1969

Donald Purucker et al.

It is certified that error appears in the above identified patent and that said Letters Patent are hereby corrected as shown below:

Column 7, line 3, after "slop-" insert -- ing position in which the central axis of the pot and kiln, --.

Signed and sealed this 14th day of April 1970.

(SEAL)
Attest:

Edward M. Fletcher, Jr.         WILLIAM E. SCHUYLER, JR.
Attesting Officer              Commissioner of Patents